United States Patent
Kaminsky et al.

(10) Patent No.: US 9,667,772 B1
(45) Date of Patent: May 30, 2017

(54) TRANSIENT, CONTEXT-DEPENDENT GROUPING OF CONTENT FOR MOBILE DEVICE DISPLAY

(71) Applicant: INTERNATIONAL BUSINESS MACHINES CORPORATION, Armonk, NY (US)

(72) Inventors: David L. Kaminsky, Chapel Hill, NC (US); David M. Ogle, Powell, OH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/185,675

(22) Filed: Jun. 17, 2016

(51) Int. Cl.
*H04M 1/725* (2006.01)
*H04W 4/18* (2009.01)
*H04W 4/02* (2009.01)

(52) U.S. Cl.
CPC ... *H04M 1/72569* (2013.01); *H04M 1/72566* (2013.01); *H04M 1/72572* (2013.01); *H04W 4/021* (2013.01); *H04W 4/18* (2013.01)

(58) Field of Classification Search
CPC ......... H04M 1/72569; H04M 1/72572; H04M 1/72566; H04W 4/18; H04W 4/021
USPC .................................. 455/414.1–414.4, 566
See application file for complete search history.

(56) References Cited

U.S. PATENT DOCUMENTS

| | | | | |
|---|---|---|---|---|
| 6,564,259 B1 * | 5/2003 | Baber | ................. | G06F 17/3089 707/E17.116 |
| 7,747,963 B2 * | 6/2010 | Othmer | .............. | G06Q 30/0243 709/219 |
| 7,899,813 B2 | 3/2011 | Song et al. | | |
| 8,626,136 B2 * | 1/2014 | Ozzie | ................ | G06F 17/30867 455/414.2 |
| 8,954,452 B2 * | 2/2015 | Cao | ................... | G06F 17/30702 707/749 |
| 8,959,098 B2 * | 2/2015 | Skibiski | ................ | G06Q 30/02 455/404.2 |
| 8,990,384 B2 | 3/2015 | Tallgren et al. | | |
| 9,167,520 B2 | 10/2015 | Jin et al. | | |

(Continued)

OTHER PUBLICATIONS

IBM Corporation, "z/Architecture® Principles of Operation," IBM Publication No. SA22-7832-10, Mar. 2015.

(Continued)

*Primary Examiner* — Sharad Rampuria
(74) *Attorney, Agent, or Firm* — Michael A. Petrocelli, Esq.; Kevin P. Radigan, Esq.; Heslin Rothenberg Farley & Mesiti P.C.

(57) ABSTRACT

A dependent context is provided for a mobile device. The dependent context is a context-dependent logical grouping of specified content for display on the mobile device, and may be provided by: receiving an indication of the specified content for inclusion in the dependent context; loading the specified content into the mobile device; and activating the dependent context on the mobile device. The activating may include activating the dependent context in a display interface of the mobile device. In enhanced aspects, subsequent to the activating, the dependent context may be automatically deactivated. The automatically deactivating, which may be based on time, a calendar day, an event, a location of the device, etc., may include automatically removing the dependent context from the display interface of the mobile device.

17 Claims, 7 Drawing Sheets

(56) References Cited

U.S. PATENT DOCUMENTS

| | | | |
|---|---|---|---|
| 2008/0137819 A1* | 6/2008 | Temov | G06Q 30/02 |
| | | | 379/88.17 |
| 2013/0024766 A1* | 1/2013 | Gupta | H04L 67/2823 |
| | | | 715/249 |
| 2016/0170808 A1 | 6/2016 | Cannon et al. | |
| 2016/0227291 A1* | 8/2016 | Shaw | H04N 21/251 |

OTHER PUBLICATIONS

IBM Corporation, "Power ISA™ Version 2.07B," International Business Machines Corporation, Apr. 9, 2015.

* cited by examiner

TRANSIENT, CONTEXT-DEPENDENT GROUPING OF CONTENT FOR MOBILE DEVICE DISPLAY

BACKGROUND

There currently exist a variety of portable computing devices (i.e., mobile devices), including wireless computing devices, such as mobile telephones, personal digital assistants (PDAs), tablets, laptop computers, wireless computers, etc., which are small, lightweight, and easily carried by users. These mobile devices (including cellular telephones, internet protocol (IP) telephones, smartphone devices, etc.) can communicate audio and data packets over wireless networks. In addition, mobile devices may also possess software applications such as a web browser application, a music player, an email program, games, etc.

The ability to personalize configuration of a mobile device continues to be an area of interest and continued research for, for instance, establishing commercial advantage in the industry.

SUMMARY

Shortcomings of the prior art are overcome and additional advantages are provided through the provision of a method which includes providing a dependent context for a mobile device, where the dependent context is a context-dependent logical grouping of specified content for display on the mobile device. The providing includes: receiving an indication of the specified content for inclusion in the dependent context; loading the specified content into the mobile device; and activating the dependent context for the mobile device, the activating including activating the dependent context in a display interface of the mobile device.

In another aspect, a system for providing a dependent context on a mobile device is provided. The dependent context is a context-dependent logical grouping of specified content for display on the mobile device, and the system includes: a memory, and a processing device communicatively coupled with the memory. The system performs a method, including: receiving an indication of the specified content for inclusion in the dependent context; loading the specified content into the mobile device; and activating the dependent context on the mobile device, the activating including activating the dependent context in a display interface of the mobile device.

In a further aspect, a computer program product is provided for providing a dependent context for a mobile device, where the dependent context is a context-dependent logical grouping of specified content for display on the mobile device. The computer program product includes a computer readable storage medium readable by a processing circuit and storing instructions for execution by the processing circuit for performing a method, which includes: receiving an indication of the specified content for inclusion in the dependent context; loading the specified content into the mobile device; and activating the dependent context on the mobile device, the activating including activating the dependent context in a display interface of the mobile device.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Transient contexts may be desirable for mobile devices, such as, for a trip. For instance, a user may have a vacation planned to San Francisco, and may wish to have transient data on the mobile device, particularly if the trip includes a drive into areas with limited, or no, mobile data connection. In such a case, the user may wish to have a map stored offline in the mobile device. Further, the user may wish to bookmark certain points of interest on the mobile device browser, or the user may wish to have games readily available for the trip, or videos. Adding complexity, the trip may involve a stop at the Grand Canyon, with each stop having different sets of localized data. Further, once the trip is finished, the information becomes stale, so not only may the user wish the information to not be prominent, the user may wish the information to be removed or deleted from their mobile device. Beyond that, the user may wish to temporarily alter the configuration of the mobile device. For example, if an airline eTicket is present on the phone, it is helpful to turn off auto-rotation on the display screen, or, if the user is traveling internationally, the user may wish to change the phone's default dialer to, for instance, Skype™ (which is offered by Skype Technologies S.A.R.L. of Redmond, Wash. (USA)).

Therefore, described herein in one or more aspects is a process for implementing a dependent context, which includes creating, storing, and deleting transient context information related to, for instance, an event, a location, an activity, etc., and to automatically making the context prominent on the user's mobile device, for instance, based on an occurrence of a triggering event, such as the user's arrival at or departure from a specified geolocation.

Before further discussing implementing a dependent context in accordance with one or more aspects of the present invention, mobile devices are briefly described. By way of example, in one or more embodiments, a mobile device may have a wireless communication capability, and be, for instance, a mobile phone, a personal digital assistant (PDA), a wireless computer, a laptop computer, tablet, etc. The wireless communication capability or system may be, for instance, a Code Division Multiple Access (CDMA) system, a Global System for Mobile Communication (GSM), a Wideband CDMA (W-CDMA) system, a Long-Term Evolution (LTE) system, an LTE Advanced system, etc.

The mobile device may be capable of providing bidirectional communication via a receive path and a transmit path. On the receive path, signals transmitted by base stations may be received by an antenna, and provided to a receiver. The receiver conditions and digitizes the receive signals, and provides the conditioned and digitized signals to a digital section of the mobile device for further processing. On a transmit path, a transmitter may receive data to be transmitted from the digital section, and process and condition the data, and generate a modulated signal, which may be transmitted via the antenna to one or more base stations. The receiver and the transmitter are part of the transceiver, and support, for instance, CDMA, GSM, W-CDMA, LTE, LTE Advanced, etc.

The digital section of the mobile device may include various processing, interfaces, and memory units, such as, for example, a modem processor, a reduced instruction set computer/digital signal processor (RISC/DSP), a controller/processor, an internal memory, a generalized audio encoder, a generalized audio decoder, a graphics/display processor, and/or an external bus interface (EBI). The modem processor may perform processing for data transmission and reception, for example, encoding, modulation, demodulation, and decoding. The RISC/DSP may perform general and specialized processing for the wireless device. The controller/processor may control the operation of various processing and interface units within the digital section. The internal memory stores data and/or instructions for various units within the digital section.

A generalized audio encoder performs encoding for input signals from an audio source, a microphone, etc. A generalized audio decoder performs decoding for coded audio data and provides output signals to, for instance, a speaker/headset. It should be noted that the generalized audio encoder and the generalized audio decoder are not necessarily required for interface with the audio source, the microphone, and speaker/headset, and thus, may not be part of the mobile device. The graphics/display processor performs processing for graphics, videos, images, and texts, which are presented to a display unit. The EBI facilitates the transfer of data between the digital section and a main memory. The digital section may be implemented with one or more processors, DSPs, microprocessors, RISCs, etc. The digital section may also be fabricated on one or more application-specific integrated circuits (ASICs), and/or other types of integrated circuits (ICs).

In general, a mobile device such as described herein is indicative of various types of devices, such as a wireless phone, a cellular phone, a laptop computer, a wireless multimedia device, a tablet, a wireless communication personal computer (PC), a PDA, etc. Any mobile device such as referenced herein may have memory for storing instructions and data, as well as hardware, software, and firmware, and combinations thereof.

In one or more aspects, a dependent context such as disclosed herein refers to a context-dependent logical groping of specified content for transient display on a mobile device, such as one or more of the devices discussed above. Unless stated otherwise, a dependent context may be a collection of state items stored on the mobile device. A state item can include, for instance, data, installed applications and/or configurations (such as bookmarks, default phone dialers, etc.). The dependent context creation and activation, deactivation, and transient display disclosed may be implemented by various means. For instance, the techniques described herein may be implemented in hardware, software, firmware, or combinations thereof. Those of ordinary skill in the art will appreciate that the various illustrative logical blocks, modules, circuits, and steps described in connection with the description provided may be implemented as electronic hardware, computer software, or combinations of both. Whether the functionality described is implemented as hardware or software is dependent on the particular application and design for the overall system. Skilled artisans may implement the functionality described hereinbelow with varying ways for each particular application, without departing from the scope of the present invention.

Provided herein are a method, system, and computer program product for providing a displayable dependent context for a mobile device. The displayable dependent context, or dependent context, or simply context, is, in one or more implementations, a transient, logical grouping of specified content for the mobile device. The logical grouping includes specified content; that is, information, data, applications, device configurations, etc., relating to the dependent context. As explained further below, the dependent context may be shown, displayed, or formatted as any desired visual indicator, such as in a separate pane, a separate window, a separate folder, a box illustrating context content, etc., on the display unit or interface of the mobile device. Further, the dependent context may be for, for instance, a context relating to an event, a location, an activity, etc., and in one or more implementations, may even include one or more configuration settings for the mobile device.

Figure 1:
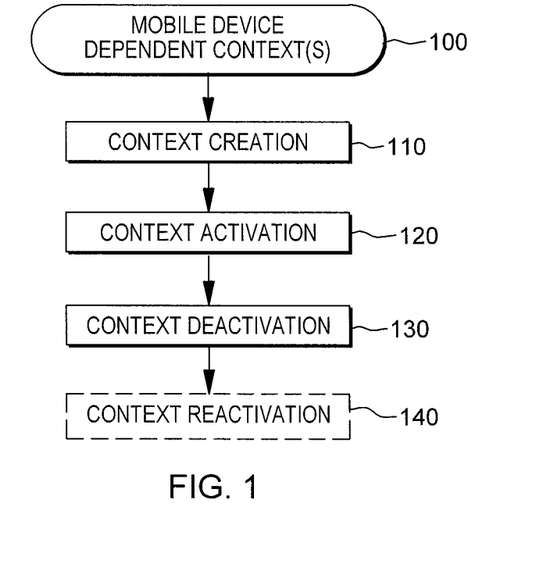
FIG. 1 depicts one embodiment of a process of implementing a dependent context on a mobile device, in accordance with one or more aspects of the present invention.

By way of example, FIG. 1 depicts one embodiment of a process for providing and handling a dependent context on a mobile device. Provision of a dependent context 100 includes, for instance, creating a dependent context 110 for the mobile device, activating specified content included in the dependent context 120; and subsequently, automatically deactivating the dependent context 130 (ensuring the transient nature of the dependent context on the display interface); and optionally, at some future time, reactivating the dependent context on the mobile device 140.

Figure 2:
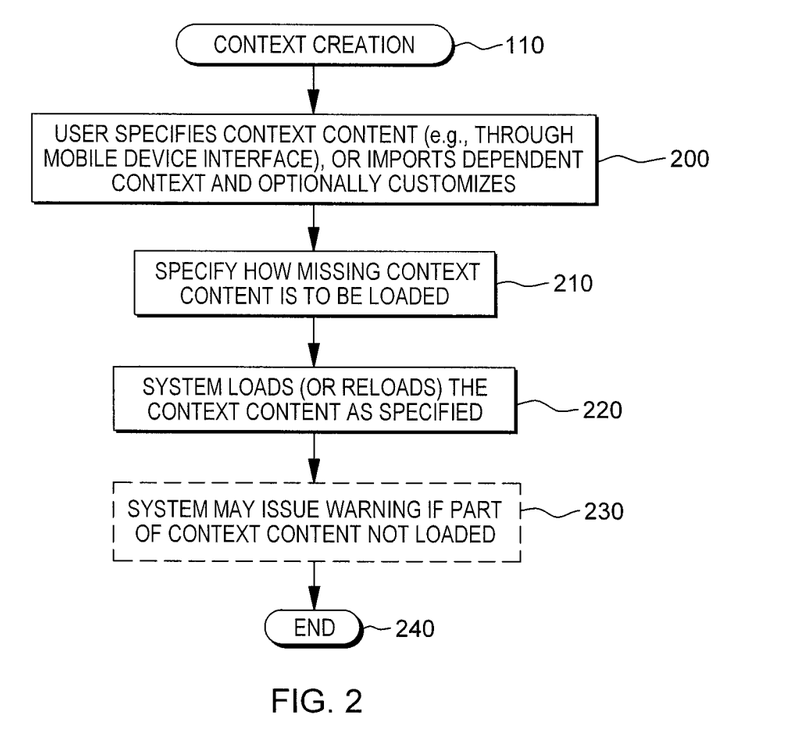
FIG. 2 depicts one embodiment of a process for creating a dependent context for a mobile device, in accordance with one or more aspects of the present invention.

FIG. 2 depicts one embodiment of a process for creating a dependent context 110 on a mobile device, in accordance with one or more aspects of the present invention. As illustrated, the process may include a user of the mobile device specifying content for inclusion in the dependent context, such as through one or more mobile device interfaces, and/or the importing of a context content list into the mobile device, which may then optionally be customized by the mobile device user 200. For instance, a context may be created by a user explicitly specifying or identifying desired contents for the context. Alternatively, or additionally, a user could import a preexisting context, such as from a known repository, or using a known social website or other transfer. For instance, users who 'like' or 'follow' a certain person may have that person's dependent context applied to their mobile device when they are to be, for instance, at the same event, location, activity, etc. By way of further example, an imported dependent context may have, for instance, a specified content list of items included in the context. In such a case, the receiving user may specify, for instance, via their mobile device, which of the items are to be included or deleted on their mobile device from the imported dependent context, or may otherwise specify a customization of the imported context. For instance, an imported context might specify a French restaurant, for which the user might substitute a different restaurant, such as an Italian restaurant. The dependent context processor system accepts the created dependent context, and stores a representation of the context within the mobile device, for instance, within a display interface of the mobile device.

In one or more embodiments, a user may specify how missing content should be loaded 210, and the dependent context system may load (or reload) the specified content as specified 220. For instance, upon creation of a context, a user may specify, and the dependent context system may accept the user's specification, how missing specified content is to be loaded into the mobile device. Missing content might include, for example, an application not already loaded on the mobile device, offline content (such as maps and/or multimedia, and similar items), etc. Examples of loading directives may include "immediate", "when mobile device is idle", "when mobile device is connected to WiFi", a certain time period before the event, a geolocation, or an activity around which the context is created, etc. Further, different content for the dependent context may be loaded differently. For instance, relatively small-size data content may be loaded immediately, and larger content may be loaded when the electronic device is connected to WiFi. The dependent context system may load the context content according to the specified directives. In addition, the system may optionally issue one or more warnings if part of the specified content is not successfully loaded as the context (that is, the event, location, activity, etc.), approaches 230, which completes the depicted embodiment of context creation 240.

Figure 3:
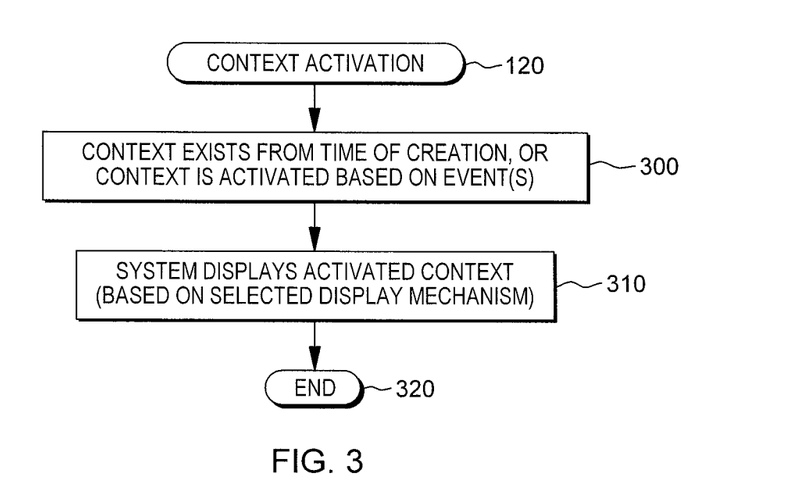
FIG. 3 depicts one embodiment of a process for activating a dependent context on a mobile device, in accordance with one or more aspects of the present invention.

FIG. 3 depicts one embodiment of a process for activating a dependent context 120 on the mobile device. In one or more implementations, a context may exists from the time of creation, or the context may be activated based on one or more events 300. In particular, a context may be activated by default, that is, the context may exist from the time that it is created, or may be activated according to one or more events. An event could include arrival at a location, or approaching a location (such as indicated by a GPS reading, or entering an airport), time (as indicated explicitly by a clock, or inferred from a calendar entry), or other similar triggers. Combinations of triggers may also be used, such as "calendar indicates a trip to San Francisco, arrived at the airport". The system displays the dependent context, for instance, based on a selected display of the mobile device 310, which completes one embodiment of context activation 320.

Note in this regard, that the selected display refers, in one or more implementations, to a display interface depicting the logical grouping of specified content for the context on, for instance, a separate display plane of the electronic device, a separate display window of the electronic device, a display folder on the mobile device, etc. Examples of these are respectively depicted in FIGS. 4A-4C.

Figure 4A:
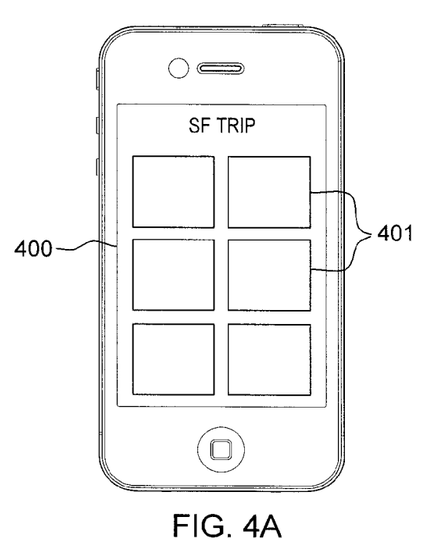
FIGS. 4A-4C depict different displayed logical groupings of context-dependent content on a mobile device, in accordance with one or more aspects of the present invention.
Figure 4B:
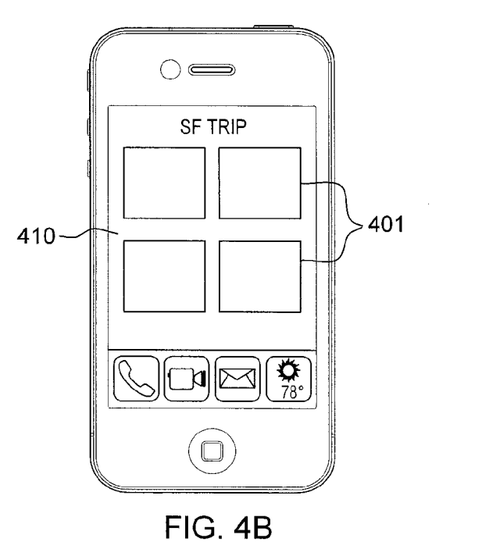
Figure 4C:
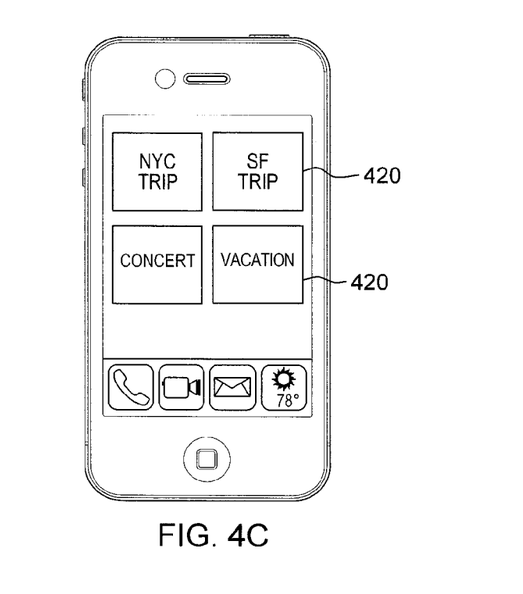

In particular, in FIG. 4A, a dependent context is illustrated, which is displayed on a separate display pane 400, such as may be arrived at by moving from one display pane, right or left, to another display pane on the mobile device. As illustrated, in this implementation, the dependent context (e.g., "SF Trip") includes multiple icons or representations 401 of different specified content included within the context. In FIG. 4B, the dependent context is depicted in a separate display window 410 on the mobile device, with other icons also being presented on the same display pane as the dependent context. Again, the dependent context includes one or more icons or representations 401 of different items grouped within the context. In FIG. 4C, the dependent context is illustrated as a display folder 420 of one of a plurality of display folders, each one of which may have been created for a different event, location, activity, etc. To enter or expand the dependent context, the user would simply tap on the desired display folder 420.

Note that, in one or more implementations, as context activation approaches, the representation of the dependent context might be moved automatically from, for instance a secondary plane, or other location, to a primary pane on the mobile device.

Figure 5:
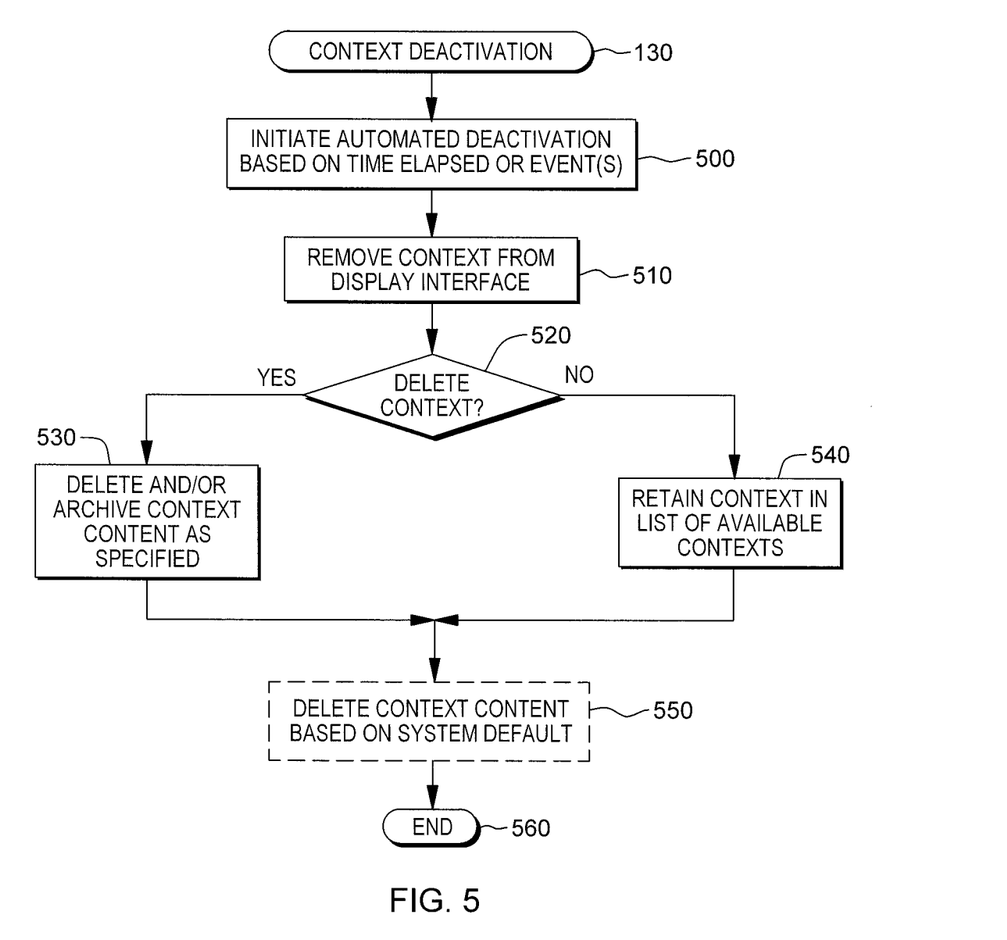
FIG. 5 depicts one embodiment of a process for deactivating a dependent context on a mobile device, in accordance with one or more aspects of the present invention.

FIG. 5 illustrates one embodiment of a process for dependent context deactivation 130, one or more aspects of which may be automatically performed by the dependent context processing or system. Deactivation may be automatically initiated based, for example, on elapsed time, occurrence of an event, etc., 500. In this regard, time may refer to a date and time combination as specified by the mobile device user. An event may be similar to an activation event, though likely in reverse. For instance, the mobile device user may arrive home from a trip which was the subject of a dependent context, and upon arrival home, the dependent context may be automatically deactivated by the system.

When a context is deactivated, the context is removed from the display interface 510 of the mobile device. This removal ensures the transient nature of the dependent context. Processing then determines whether to delete the context 520. If "yes", then the system deletes and/or or archives the specified content, such as directed or programmed by a user 530. For example, a user might instruct that the context be completely deleted upon completion of the subject event or activity giving rise to the context, which might be appropriate for a "once in a lifetime trip". Alternatively, the context or subject matter grouping could be repeated, possibly frequently, in which case the dependent context processing or system could archive the content of the context, or the entire context, thereby allowing it to be readily reactivated in the future (i.e., could be archived for subsequent retrieval and reactivation). If the context is not to be deleted, then the context might be retained in a list of available contexts 540 on the mobile device. Alternatively, if the context is not to be deleted, it might be automatically moved, for instance, from a primary pane on the mobile device to a secondary pane, or other location, on the mobile device.

Additionally, a user could mark certain content as context-dependent, and always delete such items. For example, an airline ticket image will only be useful for a particular trip. The system may automatically delete such content, while retaining the overall context.

The system may also optionally include default settings which require automated deletion of specified content 550. For instance, any content over x MB may be automatically deleted, and then reloaded when needed. Content under x MB may be retained. Alternatively, all content may be deleted if available memory is, for instance, 80% full. As noted, the system could then reload any missing content when the dependent context is activated or reactivated on the mobile device. This completes the depicted embodiment of context deactivation 560.

Exemplary embodiments of a computing environment to implement one or more aspects of the present invention are described below with reference to FIGS. 6-8.

Figure 6:
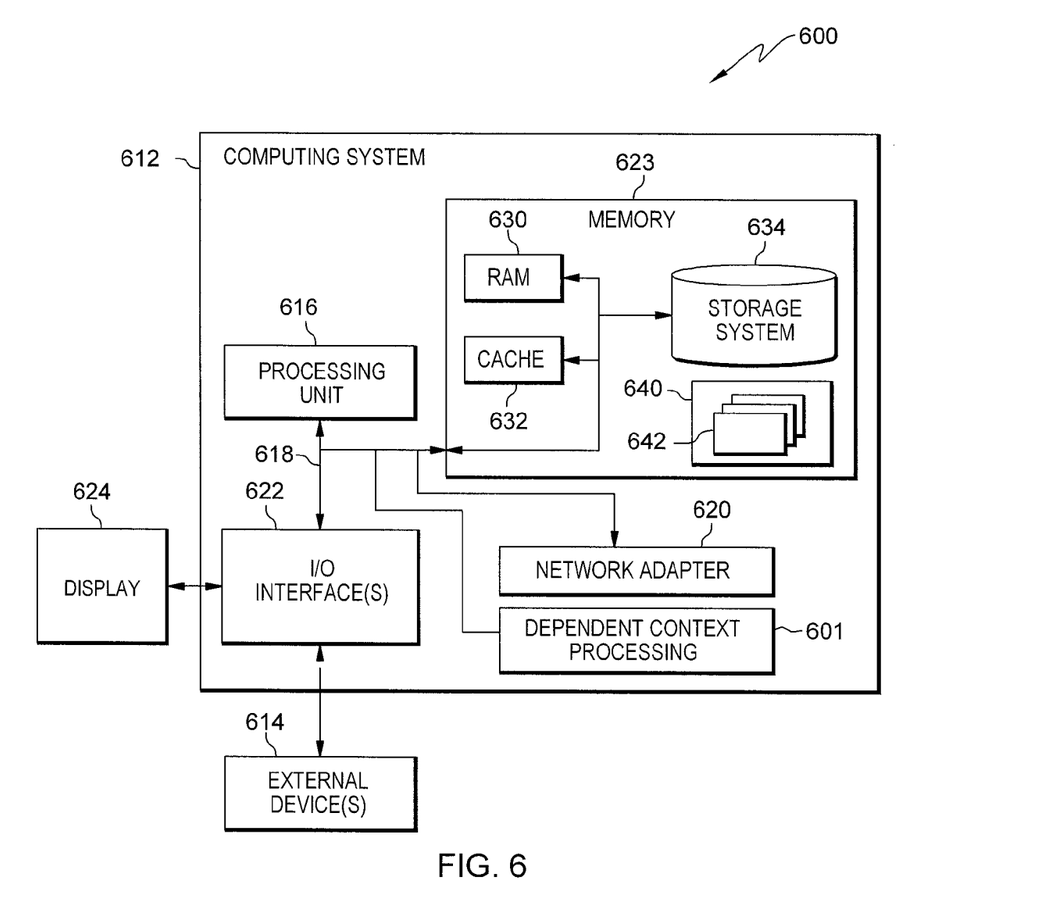
FIG. 6 depicts one embodiment of a computing system to incorporate dependent context processing, in accordance with one or more aspects of the present invention.

By way of further example, FIG. 6 depicts one embodiment of a computing environment 600, which includes a computing system 612. Examples of well-known computing systems, environments, and/or configurations that may be suitable for use with computer system 612 include, but are not limited to, a wireless computer, a handheld or laptop computer or device, a mobile phone, a programmable consumer electronic device, a tablet, a personal digital assistant (PDA), and the like.

Computing system 612 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 6, computing system 612, is shown in the form of a general-purpose computing device. The components of computing system 612 may include, but are not limited to, one or more processors or processing units 616, a system memory 623, and a bus 618 that couples various system components including system memory 623 to processor 616.

In one embodiment, processor 616 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 612 may include a variety of computer system readable media. Such media may be any available media that is accessible by computing system 612, and it includes both volatile and non-volatile media, removable and non-removable media.

System memory 623 can include computer system readable media in the form of volatile memory, such as random access memory (RAM) 630 and/or cache memory 632. Computing system 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 618 by one or more data media interfaces. As described below, memory 623 may include at least one program product having a set (e.g., at least one) of program modules that are configured to carry out the functions of embodiments of the invention.

Program/utility 640, having a set (at least one) of program modules 642, may be stored in memory 632 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein. Alternatively, a separate, dependent context processing system, module, logic, etc., 601 may be provided within computing environment 612.

Computing system 612 may also communicate with one or more external devices 614 such as a keyboard, a pointing device, a display 624, etc.; one or more devices that enable a user to interact with computing system 612; and/or any devices (e.g., network card, modem, etc.) that enable computing system 612 to communicate with one or more other computing devices. Such communication can occur via Input/Output (I/O) interfaces 622. Still yet, computing system 612 can communicate with one or more networks such as a local area network (LAN), a general wide area network (WAN), and/or a public network (e.g., the Internet) via network adapter 620. As depicted, network adapter 620 communicates with the other components of computing system, 612, via bus 618. It should be understood that although not shown, other hardware and/or software components could be used in conjunction with computing system 612. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 6. Computer system/server 602 of FIG. 6 may be practiced in distributed cloud computing environments where tasks are performed by remote processing devices that are linked through a communications network. In a distributed cloud computing environment, program modules may be located in both local and remote computer system storage media including memory storage devices. Computer system/server 602 is capable of being implemented and/or performing any of the functionality set forth hereinabove.

Figure 7:
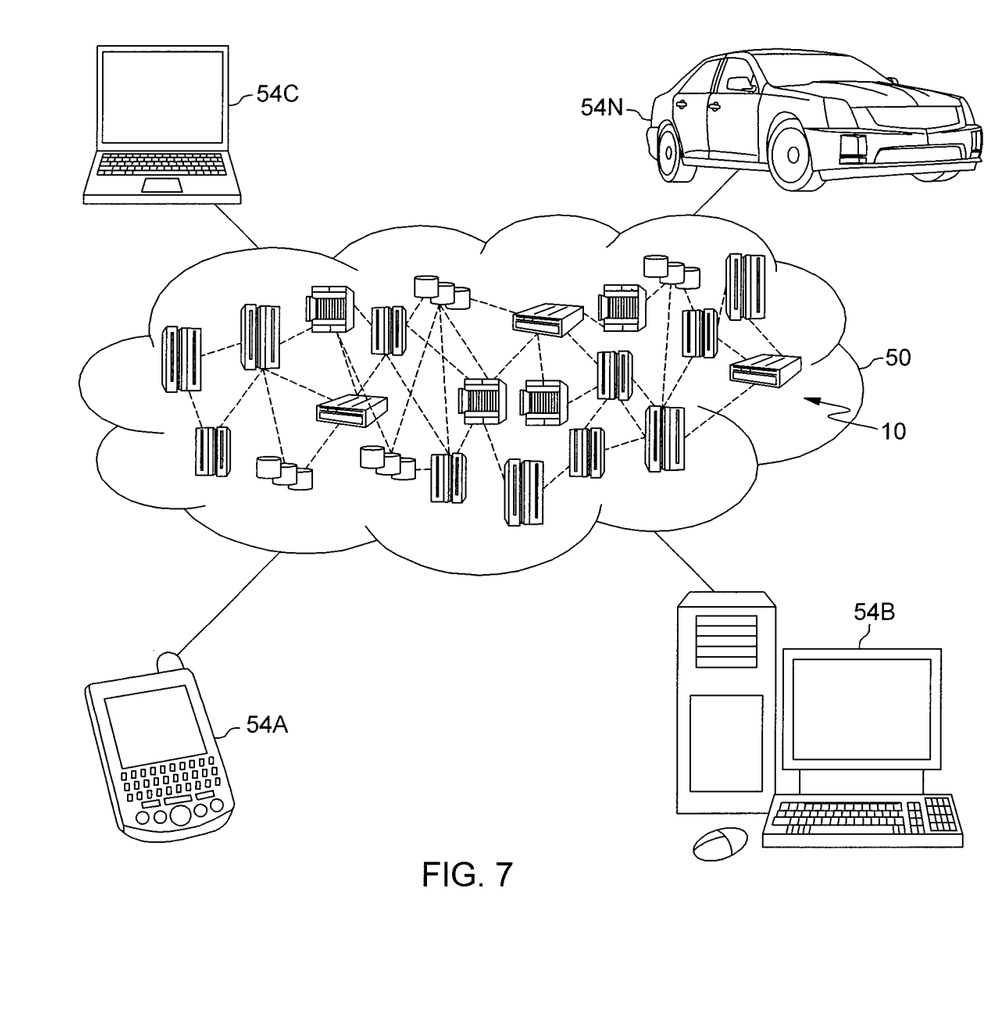
FIG. 7 depicts one embodiment of a cloud computing environment, which may implement or be used in association with one or more aspects of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
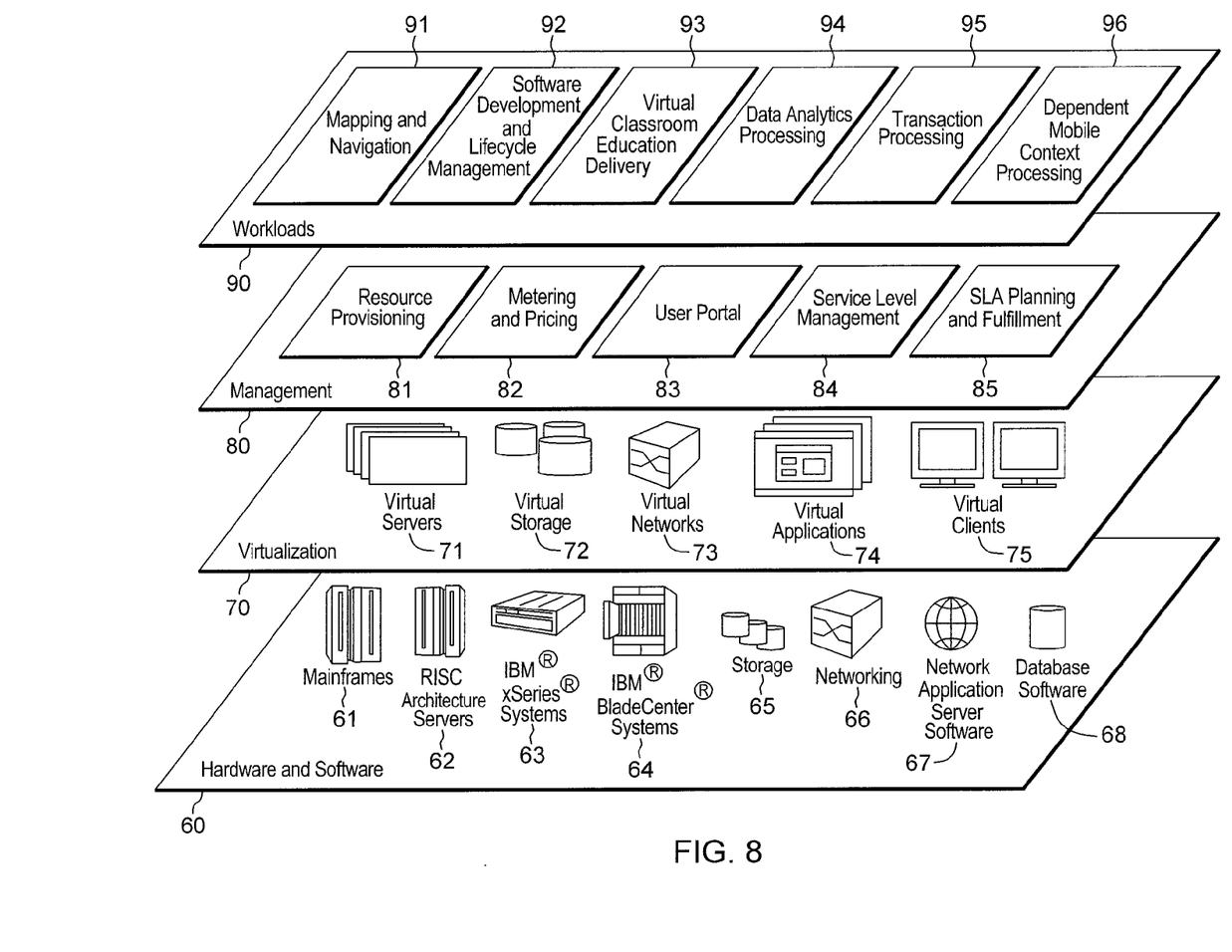
FIG. 8 depicts an example of extraction model layers, which may facilitate or implement a dependent context process, in accordance with one or more aspects of the present invention.

Referring now to FIG. 8, a set of functional abstraction layers provided by cloud computing environment 50 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dependent mobile context processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method comprising:
   providing a dependent context for a mobile device, the dependent context being a context-dependent logical grouping of specified content for display on the mobile device, the providing comprising:
   receiving an indication of the specified content for inclusion in the dependent context;
   loading the specified content into the mobile device;
   activating the dependent context on the mobile device,
   the activating including activating the dependent context in a display interface of the mobile device;
      subsequent to the activating, automatically deactivating the dependent context,
   the automatically deactivating including removing the dependent context from the display interface of the mobile device, and
   the automatically deactivating being based on one of a group consisting of a time, a calendar day, an event and a location of the mobile device; and
   automatically deactivating includes retaining the dependent context in a list of dependent contexts for subsequent retrieval and reactivation.

2. The method of claim 1, wherein the receiving comprises receiving the indication of specified content from a user through an interface of the mobile device.

3. The method of claim 1, wherein the specified content is part of an imported dependent context, and the receiving comprises receiving the indication of the specified content with the imported dependent context.

4. The method of claim 1, further comprising receiving a specification of how or when the specified content is to be loaded into the mobile device, and wherein the loading comprises loading the specified content pursuant to the specification.

5. The method of claim 1, further comprising, subsequent to the activating, issuing a warning on the mobile device should part of the specified content remain unloaded into the mobile device.

6. The method of claim 1, wherein the activating comprises automatically activating the dependent context on the mobile device based on one of a group consisting of a time, a calendar day, an event, and a location of the mobile device.

7. The method of claim 1, wherein the dependent context is a transient grouping and is displayable on the mobile device as one of a display group consisting of a separate display pane on the mobile device, a display window on the mobile device, and a display folder on the mobile device.

8. The method of claim 1, wherein the dependent context is based on one of a group consisting of an event, a location, and an activity.

9. The method of claim 1, wherein the dependent context comprises a temporary setting configuration for the mobile device, and the activating comprises automatically activating the temporary setting configuration on the mobile device.

10. The method of claim 1, wherein the automatically deactivating includes automatically deleting, at least in part, the specified content from the mobile device.

11. The method of claim 1, further comprising, subsequent to the automatically deactivating of the dependent context, reactivating the dependent context on the mobile device to reuse the dependent context.

12. A system for providing a dependent context on a mobile device, the dependent context being a context-dependent logical grouping of specified content for display on the mobile device, the system comprising:
a memory; and
a processing device communicatively coupled with the memory, wherein the system performs a method comprising:
receiving an indication of the specified content for inclusion in the dependent context;
loading the specified content into the mobile device;
activating the dependent context on the mobile device, the activating including activating the dependent context in a display interface of the mobile device;
subsequent to the activating, automatically deactivating the dependent context,
the automatically deactivating including removing the dependent context from the display interface of the mobile device, and
the automatically deactivating being based on one of a group consisting of a time, a calendar day, an event and a location of the mobile device; and
automatically deactivating includes retaining the dependent context in a list of dependent contexts for subsequent retrieval and reactivation.

13. The system of claim 12, further comprising receiving a specification of how or when the specified content is to be loaded into the mobile device, and wherein the loading comprises loading the specified content pursuant to the specification.

14. The system of claim 12, wherein the activating comprises automatically activating the dependent context on the mobile device based on one of a group consisting of a time, a calendar day, an event or a location of the mobile device.

15. The system of claim 12, wherein the dependent context is based on one of a group consisting of an event, a location, and an activity.

16. The system of claim 12, wherein the dependent context comprises a temporary setting configuration for the mobile device, and the activating comprises automatically activating the temporary setting configuration on the mobile device.

17. A computer program product for providing a dependent context for a mobile device, the dependent context being a context-dependent logical grouping of specified content for display on the mobile device, the computer program product comprising:
a non-transitory computer-readable storage medium readable by a processing circuit and storing instructions for execution by the processing circuit for performing a method comprising:
receiving an indication of the specified content for inclusion in the dependent context;
loading the specified content into the mobile device;
activating the dependent context on the mobile device, the activating including activating the dependent context in a display interface of the mobile device;
subsequent to the activating, automatically deactivating the dependent context,
the automatically deactivating including removing the dependent context from the display interface of the mobile device, and
the automatically deactivating being based on one of a group consisting of a time, a calendar day, an event and a location of the mobile device; and
automatically deactivating includes retaining the dependent context in a list of dependent contexts for subsequent retrieval and reactivation.

\* \* \* \* \*